United States Patent
Mittal

(10) Patent No.: US 7,809,364 B2
(45) Date of Patent: Oct. 5, 2010

(54) APPARATUS, AND ASSOCIATED METHOD, FOR PROVIDING AN OPERATION PARAMETER TO A MOBILE STATION OF A RADIO COMMUNICATION STATION

(75) Inventor: Gaurav Mittal, San Diego, CA (US)

(73) Assignee: Nokia Mobile Phones Limited, Espoo (FI)

( * ) Notice: Subject to any disclaimer, the term of this patent is extended or adjusted under 35 U.S.C. 154(b) by 252 days.

(21) Appl. No.: 09/918,394

(22) Filed: Jul. 30, 2001

(65) Prior Publication Data

US 2003/0022662 A1 Jan. 30, 2003

(51) Int. Cl.
*H04M 3/00* (2006.01)
*H04W 4/00* (2009.01)

(52) U.S. Cl. .......................... 455/419; 455/466

(58) Field of Classification Search ............. 455/418, 455/419, 420, 422.1, 466, 412.1, 517, 412.2
See application file for complete search history.

(56) References Cited

U.S. PATENT DOCUMENTS

| 5,794,142 | A | * | 8/1998 | Vanttila et al. | 455/419 |
| 5,881,235 | A | * | 3/1999 | Mills | 709/221 |
| 5,974,312 | A | * | 10/1999 | Hayes et al. | 455/419 |
| 6,018,654 | A | * | 1/2000 | Valentine et al. | 455/414 |
| 6,023,620 | A | * | 2/2000 | Hansson | 455/419 |
| 6,044,275 | A | * | 3/2000 | Boltz et al. | 455/466 |
| 6,104,924 | A | * | 8/2000 | Shirai | 455/418 |
| 6,408,175 | B1 | * | 6/2002 | Park | 455/411 |

* cited by examiner

*Primary Examiner*—Quochien B Vuong
(74) *Attorney, Agent, or Firm*—Alston & Bird LLP

(57) ABSTRACT

Apparatus, and an associated method, for downloading an operational parameter to a mobile station. The operational parameter is stored at a server operated by an operator of a communication system in which the mobile station is operable. When the parameter is to be downloaded to the mobile station, the server instructs a SMS, or other data message, service center to generate a data message to be delivered to the mobile station, instructing the mobile station to initiate a data call connection with the server. When a data call connection is formed, the operational parameter is downloaded to the mobile station, thereafter to be used by the mobile station in subsequent communication operations in the communication system.

21 Claims, 3 Drawing Sheets ic communication systems have been promulgated. As advancements in communication technologies permit, the operating standards are amended to incorporate new and improved features to the standards, and new standards are promulgated to set the operational standards of new types of cellular communication systems.

Various of such upgrades, and other revisions, require changes to be made in the operational parameters pursuant to which a mobile station operable in a cellular communication system operates. To take advantage of the revision, the operational parameter must be provided to the mobile station. And, in some instances, revision of the operational parameter at the mobile station is necessary to permit continued operation of the mobile station in the cellular communication system.

An operational parameter of the mobile station which might need to be changed, includes, for instance, a parameter associated with a preferred roaming list, a parameter associated with a new number assignment module (NAM) associated with the mobile station, a new value of a parameter associated with an enhanced variable rate coder, a parameter associated with a changed IP (Internet Protocol) address associated with the mobile station, and an access point set-up parameter list. Other parameters might also be susceptible to change or revision. And, newly-created parameters might also need to be provided to the mobile station.

A conventional manner by which to effectuate the change of an operational parameter at the mobile station is to require that the mobile station be returned to a service center at which reprogramming of the mobile station is carried out to effectuate the revision of the operating parameter, as appropriate. Return of the mobile station is typically an inconvenience to the user of the mobile station. Reduced user-satisfaction of the service provider can result, particularly if the service center is inconveniently located or if repeated returns are necessitated to effectuate successive changes of operational parameters.

And, maintenance of a service center within proximity of the users of the mobile stations and the need to staff the service center necessitate significant investment and expense to the service provider.

If a manner could be provided by which to effectuate revision of the operating parameter, or parameters, pursuant to which the mobile station is operable without necessitating return of the mobile station to a service center, improved user-satisfaction of the service provider would be facilitated. And, costs associated with the maintenance of the service centers would also be lessened.

It is in light of this background information related to operating parameters pursuant to which a mobile station is operable that the significant improvements of the present invention have evolved.

APPARATUS, AND ASSOCIATED METHOD, FOR PROVIDING AN OPERATION PARAMETER TO A MOBILE STATION OF A RADIO COMMUNICATION STATION

The present invention relates generally to a manner by which to deliver an operational parameter to a cellular, or other, mobile station, pursuant to which the mobile station is operable. More particularly, the present invention relates to apparatus, and an associated method, for downloading the operational parameter to the mobile station by way of a radio link. The operational parameter is downloaded pursuant to a data call connection formed with the mobile station. When an operational parameter is to be downloaded, a data message, such as an SMS (Short Message Service) message, is sent to the mobile station requesting the mobile station to initiate a data call connection with a node-device at which the operational parameter is stored, or otherwise available. Responsive to the SMS, or other data, message delivered to the mobile station, a data call connection is formed between the mobile station and the node-device, and the operational parameter is delivered pursuant to the connection.

BACKGROUND OF THE INVENTION

A communication system is used by a sending party to communicate data to a receiving party. The data is sent by a sending station upon a communication channel for delivery to a receiving station. Through appropriate selection of the communication channel, communication of the data is effectuable between sending and receiving stations, even when the stations are spaced apart from one another by significant distances.

Advancements in communication technologies have permitted the development, and implementation, of many different types of communication systems to effectuate the communication of data between sending and receiving stations positioned at separate, spaced-apart locations. Increasingly-large amounts of data, at increasingly-higher rates are provided with successive advancements in the communication technologies.

A radio communication system is exemplary of a communication system in which advancements in communication technologies have been applied to increase the data communication capacity of the radio communication system. In a radio communication system, communication channels formed between the sending and receiving stations are defined upon radio links which extend between the sending and receiving stations.

Wire line connections are not required to interconnect the sending and receiving stations. In a conventional, wire line communication system, in contrast, a wire line connection is required upon which to define communication channels which are used to communicate the data between the sending and receiving stations. Because a wire line is not needed, a radio communication system inherently provides for increased communication mobility, relative to the use of a conventional wire line communication system. Radio communication systems are, therefore, regularly used in mobile applications and to effectuate communications between locations at which the use of wire line connections would be inconvenient or impractical.

A cellular communication system is a type of radio communication system. Cellular communication systems have been installed throughout large geographical areas of the world. A cellular communication system is operated by an operator, sometimes referred to as a service provider. And, subscribers subscribe to communicate by way of the system by purchasing a service subscription A cellular communication system is constructed pursuant to an operating specification, and various operating specifications have been promulgated.

SUMMARY OF THE INVENTION

The present invention, accordingly, advantageously provides apparatus, and an associated method, by which to provide an operational parameter pursuant to which a mobile station, such as a cellular mobile station, is operable.

Through operation of an embodiment of the present invention, a manner is provided by which to download the operational parameter to the mobile station by way of a radio link. The operational parameters are downloaded pursuant to a data call connection formed with the mobile station. When an operational parameter is to be downloaded, a data message, such as an SMS (Short Message Service) message, is sent to the mobile station requesting the mobile station to initiate a data call connection with a node-device at which the operational parameter is stored, or otherwise available. Responsive to the SMS, or other data, message delivered to the mobile station, a data call connection is formed between the mobile station and the node-device, and the operational parameter is delivered pursuant to the connection.

In one aspect of the present invention, apparatus is provided for an operator by which to communicate an operational parameter to a mobile station. When an operational parameter, already stored at a mobile station, is to be updated, or another operational parameter is to be provided to a mobile station, an indication of the operational parameter is stored at, or is otherwise resident at, a server associated with the operator of the communication system in which the mobile station is operable. The server forms a node-device that is connected to a packet data network, such as the internet backbone. The indication of the operational parameter stored at, or otherwise resident at, the server is provided thereto, such as through user actuation of a user actuator coupled to the server.

The communication system provides a data messaging service, such as SMS (Short Message Service) messaging provided in a GSM (Global System for Mobile communications) communication system. When an operational parameter of the mobile station is to be revised, updated, or otherwise provided to the mobile station, the server generates an initiation signal which is routed to a data message service center that is also coupled to the packet data network. The initiation signal initiates a downloading procedure by which to download a value defining the operational parameter to the mobile station. Subsequent to delivery of the initiation signal to the data message service center, a download-parameter request signal is caused to be generated by the data message service center. The download-parameter request signal forms a data message, such as an SMS message, which is sent to the mobile station. The download-parameter request signal requests the mobile station to request initiation of the downloading.

In another aspect of the present invention, the mobile station detects the download-parameter request signal sent to the mobile station. The request includes an indication of the identity of the server forming the node device which contains the operational parameter which is to be downloaded to the mobile station. The server, for instance, is identified by an IP (Internet Protocol) address, and the IP address of the server is contained in the download-parameter request signal.

The mobile station, responsive to detection of the download-parameter request signal, initiates a data message request to initiate a data connection between the mobile station and the server at which the operational parameter to be downloaded to the mobile station resides.

In yet another aspect of the present invention, the server is operable, responsive to detection of the request by the mobile station to initiate the data connection, to complete the data connection between the server and the mobile station. Once the data call connection is formed, the operational parameter is downloaded from the server to the mobile station.

A determination is made by the mobile station as to whether the operational parameter is successfully downloaded thereto. If so, the mobile station returns an indication of successful delivery of the operational parameter back to the server. And, if the delivery is unsuccessful, a corresponding indication is returned to the server. Upon successful completion of the downloading of the operational parameter to the mobile station, the data call connection is terminated.

Because a data message, such as an SMS message, is sent to the mobile station to initiate downloading of the operational parameter to the mobile station, and because a data call connection is formed to effectuate the downloading of the operational parameter, the mobile station need not be returned to a service center to effectuate the downloading of the operational parameter thereto. Increased convenience of usage of the mobile station is thereby permitted. And, reduced costs are accrued by the operator of the communication system as the need for the service center to perform such downloading is obviated.

In these and other aspects, therefore, apparatus, and an associated method, is provided for a radio communication system having a network part that at least communicates data messages generated at a data message service center to a mobile station. The mobile station is operable pursuant to at least a first operational parameter. Downloading of a value defining the at least the first operational parameter pursuant to which the mobile station is operable is facilitated. A download-operational-parameter initiation signal generator is coupled to receive an indication of a request to download the value defining the at least one operational parameter to the mobile station. The download-operational-parameter initiation signal generator generates an initiation signal directed to the data message service center to initiate downloading of the value defining the at least the first operational parameter to the mobile station. A download-parameter request signal generator is positioned at the data message service center. The download-parameter request signal generator generates a data-message request for communication to the mobile station. The data-message request requests initiation of the downloading.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
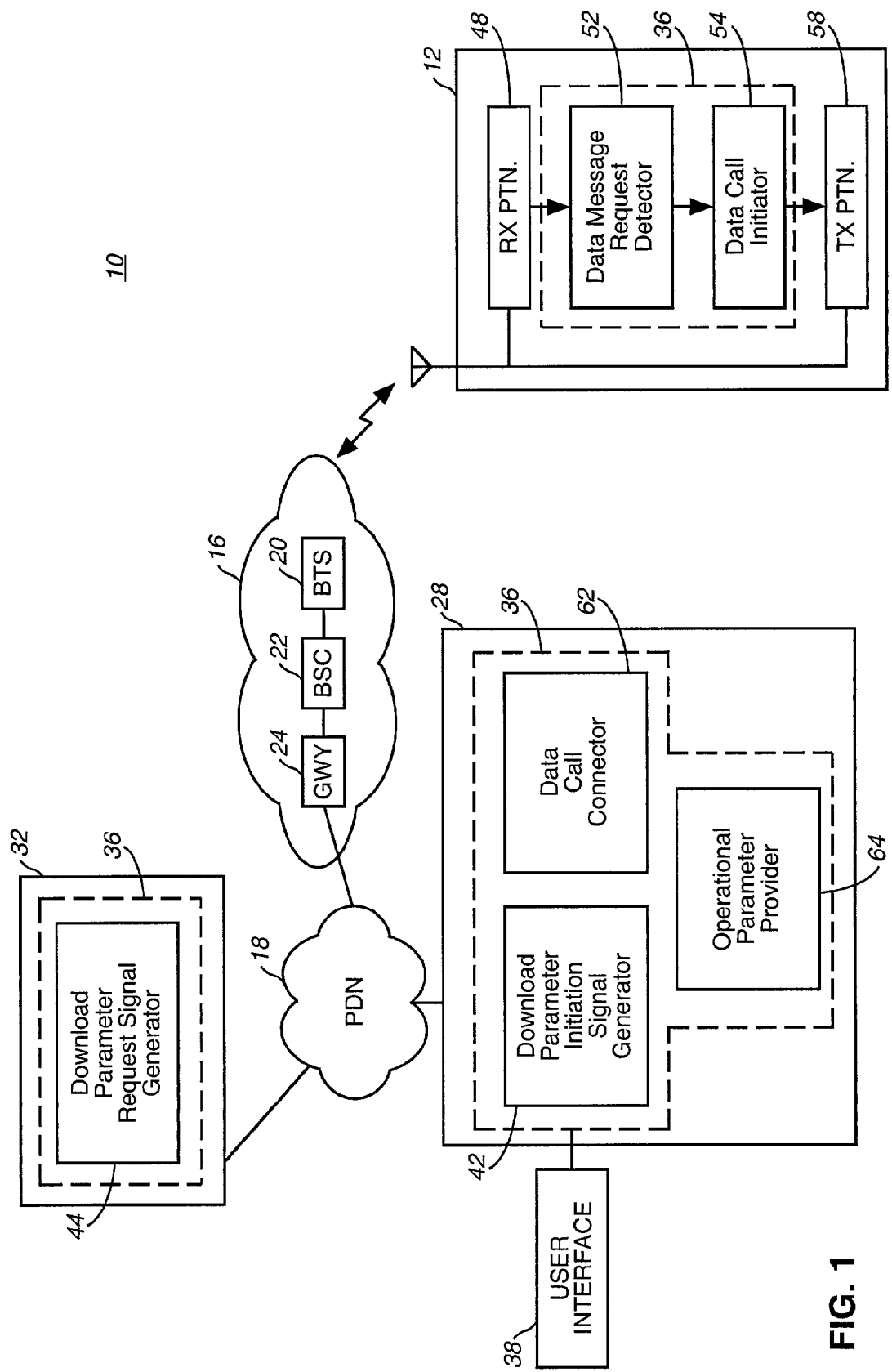
FIG. 1 illustrates a functional block diagram of a communication system in which an embodiment of the present invention is operable.

Referring first to FIG. 1, an exemplary radio communication system, shown generally at 10, provides for radio communications with a mobile station 12. Communication of data is effectuated with the mobile station by way of a radio link 14 upon which radio channels are defined. In the exemplary implementation, the communication system forms a GSM (Global System for Mobile communications), cellular communication system which provides for SMS (Short Message Service) messaging. While the following description shall describe operation of an embodiment of the present invention in which the communication system 10 comprises a GSM cellular communication system, it should be understood that operation of an embodiment of the present invention is analogously implementable in other types of communication systems.

Here, the communication system includes a network part including a radio access network 16 and a packet data network (PDN) 18 coupled thereto.

The radio access network 16 includes a plurality of base transceiver stations (BTSs), of which one base transceiver station 18 is shown in the figure. Each of the base transceiver stations defines a coverage area, referred to as a cell. When a mobile station, such as the mobile station 12 is positioned within a cell defined by a base transceiver station, communications with the mobile station are generally effectuated by way of the base transceiver station which defines the cell within which the mobile station is positioned.

The base transceiver station 20 is coupled to a base station controller (BSC) 22. Typically, a group of base transceiver stations are coupled to a single base station controller. The base station controller is operable to perform various control functions controlling operation of the base transceiver stations coupled thereto. Operations controlled by the base station controller include, for instance, channel allocations for communication sessions with mobile stations positioned within the cells defined by the base transceiver stations coupled thereto.

The base station controller is coupled by way of a gateway (GWY) 24 to the packet data network 18.

Communication devices forming nodes are coupled to the packet data network. Once suitably connected thereto, the communication devices communicate packet data by way of the packet data network. Here, a computer server 28 is connected to the packet data network. A data message service center 32 is also coupled to the packet data network. The data message center here forms an SMS (Short Message Service) service center. The data message center is operable to generate, or otherwise route, data messages, here SMS messages, to and from the mobile station 12. Other devices are similarly connected to the packet data network, capable of communicating therethrough and with the mobile station 12 by way of the radio access network and the radio links.

As noted above, the mobile station is operable pursuant to operational parameters stored thereat. There may be a need to revise, update, or otherwise provide new operational parameters to the mobile station. The communication system 10 includes an embodiment of the present invention that provides a convenient manner by which to download the operational parameter, or parameters, by way of the radio links 14 thereby remotely to install the operational parameter at the mobile station. The need otherwise to return the mobile station to a service and repair center to install the operational parameter at the mobile station is obviated.

Accordingly, the server 28 includes the apparatus 36 of an embodiment of the present invention. The apparatus 36 is coupled to receive indications of user input by way of user interface 38. The user interface forms, for instance, a computer keyboard coupled to the server 28 in conventional manner. The elements of the apparatus 36 are represented functionally. The elements are implemented in any desired manner, such as by algorithms executable by processing circuitry at the server.

The node-device apparatus includes a download parameter initiation signal generator 42 operable responsive to appropriate user input by way of the user interface, or other selection criteria, to generate an initiation signal which is routed through the packet data network to the data message service center 32. The data message service center also includes further apparatus 40 of an embodiment of the present invention. Here, the apparatus includes a download parameter request signal generator 44. Again, the element is functionally represented and can be implemented in any desired manner, again such as by an algorithm executable at a processing device of the data message service center.

The download parameter request signal generator 44 is operable to generate a data message request for communication through the packet data network, the radio access network, upon radio channels defined upon the radio link 14 to be received at the mobile station 12. The mobile station 12 includes a receive portion 48 coupled to receive the data message request generated by the data message service center and communicated to the mobile station. The mobile station also includes further apparatus 50 of an embodiment of the present invention. Here, the apparatus 50 is shown to include a data message request detector 52. Again, the elements of the apparatus 50 are shown functionally, and such elements can be implemented in any desired manner, again, for example, by algorithms executable at processing circuitry.

The data message request detector 52 detects indications of the data message request received at the receive portion 48 of the mobile station. And, when such detection is made, an indication is provided to a data call initiator and status reporter 54. When the data message request detector detects the data message request, initiation of a data call is caused to be commenced by the data call initiator and status reporter.

The data call initiator and status reporter 54 is coupled to a transmit portion 58 of the mobile station. The transmit portion transmits a data call connection initiation request to form a data call connection between the mobile station 12 and the server 28. The signal generated by the transmit portion is sent by way of the radio link 14 and is thereafter routed through the radio access network, the packet data network, and delivered to the server 28.

The apparatus 36 located at the server 28 further includes a data call connector 62 which is operable responsive to detection at the server of the signal generated by the transmit portion 58. The data call connector then originates a data call connection between the mobile station and the computer server. Once the data call connection is formed, the operational parameter is downloaded from the computer server to the mobile station pursuant to the data call connection. Here, the apparatus 36 is further shown to include an operational parameter provider 64 at which the operational parameter that is to be downloaded to the mobile station is stored or is otherwise resident. The operational parameter is stored, for instance, at a memory location of the computer server and is, for instance, entered into the computer server through user actuation of the user interface 38.

The operational parameter is downloaded to the mobile station, thereafter to be used at the mobile station pursuant to subsequent communications in the communication system. The data call initiator and status reporter is further operable to determine whether the operational parameter is successfully downloaded and to generate a report to be returned to the server to indicate at least successful downloading of the operational parameter. Upon successful downloading of the operational parameter to the mobile station, the data call connection is terminated, here through instructions generated by the data call connector 62.

Figure 2:
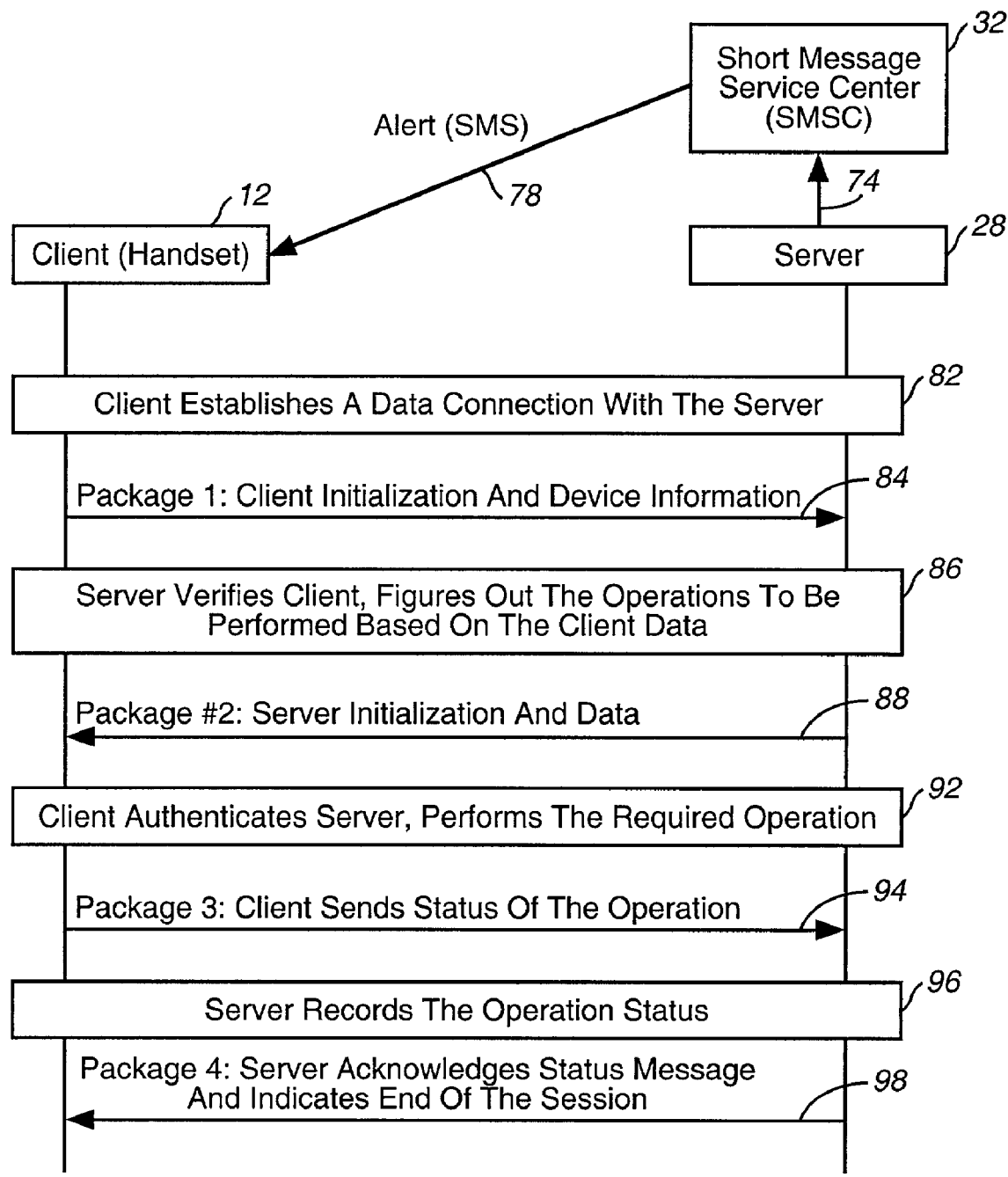
FIG. 2 illustrates a message sequence diagram representing signaling generated by various elements of the communication system shown in FIG. 1 during operation of an embodiment of the present invention.

FIG. 2 illustrates a message sequence diagram, shown generally at 72, which represents signaling generated during operation of the communication system 10 (shown in FIG. 1) during operation of an embodiment of the present invention.

The server 28 generates a download parameter initiation signal indicated by the segment 74 that is routed to the short message service center formed of the data message service center 32. Upon detection of the initiation signal, the SMS center generates an SMS message forming a data message request, indicated by the segment 78, that is communicated to the mobile station 12.

The mobile station initiates a data connection, here indicated by the block 82 with the server 28. Client initialization and device information is communicated, here indicated by the segment 84, by the mobile station to the server.

The computer server verifies the mobile station, such as pursuant to an authentication procedure, determines the operations that are to be performed based upon the information provided to the server. The verification and determinations are indicated by the block 86. The server provides server initialization and data, indicated by the segment 88 to the mobile station. The mobile station authenticates the server, and the downloading of the operational parameter is performed, indicated by the block 92. And, as indicated by the segment 94, the mobile station reports on the successful downloading of the operational parameter to the mobile station.

Here, and as indicated by the block 96, the server 28 records the status of the downloading operation. And, as indicated by the segment 98, the server acknowledges the report message generated by the mobile station and indicates the end of the communication session and terminates the data call connection.

Figure 3:
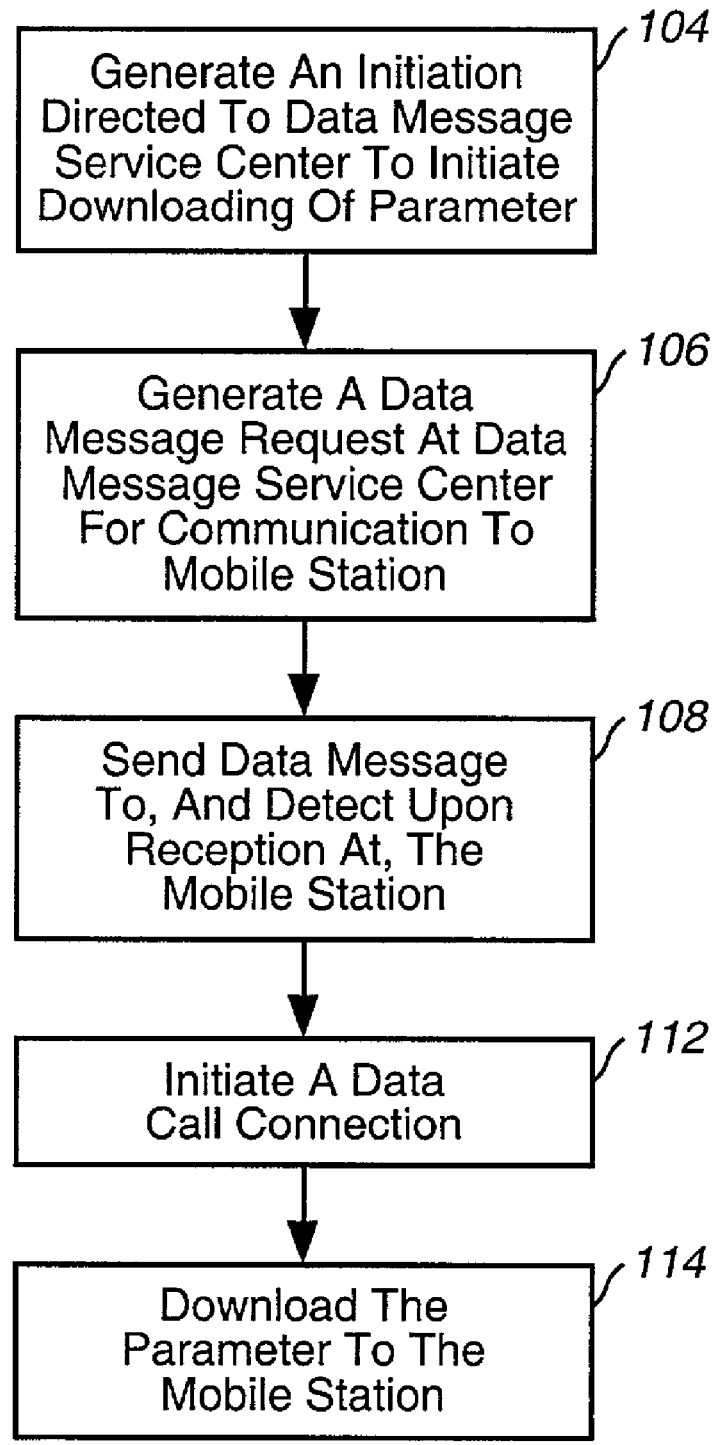
FIG. 3 illustrates a method flow diagram listing the method steps of the method of operation of an embodiment of the present invention.

FIG. 3 illustrates the method, shown generally at 102, of an embodiment of the present invention by which to facilitate downloading of a value defining at least a first operational parameter pursuant to which a mobile station is operable. The mobile station communicates in a radio communication system having a network part which at least communicates data messages generated at a data message service center.

First, and as indicated by the block 104, an initiation directed to the data message service center is generated to initiate downloading of the value defining the at least the first operational parameter to the mobile station.

Then, and as indicated by the block 106, a data message request is generated at the data message service center for communication to the mobile station. The data message request requests initiation of the downloading of the value defining the at least the first operational parameter to the mobile station.

Then, and as indicated by the block 108, the data message request is sent to, and detected at, the mobile station. Responsive to detection of the data message request, a data call connection is initiated and formed, indicated by the block 112. And, as indicated by the block 114, the at least the first operational parameter is downloaded to the mobile station.

Thereby, a manner is provided by which to download the operational parameter to the mobile station remotely, by way of radio communication of the operational parameter to the mobile station. The need otherwise to return the mobile station to a service center to have the operational parameter downloaded thereto is obviated.

The preferred descriptions are of preferred examples for implementing the invention and the scope of the invention should not necessarily be limited by this description. The scope of the present invention is defined by the following claims.

The invention claimed is:

1. An apparatus comprising:
   a network-positioned download parameter initiation signal generator configured to generate an initiation signal that initiates a request for downloading of a first mobile-station operational parameter to a mobile station in a radio communication system having a network part; and
   a network-positioned data call connector operable responsive to acceptance of the request initiated by the initiation signal generated by said network-positioned download parameter initiation signal generator, said network-positioned data call connector configured to establish a direct data call connection directly with the mobile station, the direct data call connection, once formed, for downloading the at least the first mobile-station operational parameter, the first mobile-station operational parameter being repeatedly used pursuant to subsequent communications,
   wherein the apparatus is further configured to receive device information regarding the mobile station via the direct data call connection and to determine the operations that are to be performed based on the device information prior to downloading the first mobile-station operational parameter.

2. The apparatus of claim 1 further comprising a download-parameter request signal generator to which the initiation signal is delivered, said download-parameter request generator for generating a data-message request that forms the request for downloading.

3. The apparatus of claim 2 wherein the radio communication system provides for SMS (Short Message Service) message communication, wherein the network part includes a data message service center comprising an SMS service center, and wherein said download-parameter request signal generator is positioned at the SMS service center.

4. The apparatus of claim 3 wherein the data-message request generated by said download-parameter request signal generator comprises an SMS message for communication to the mobile station.

5. The apparatus of claim 2 wherein said apparatus, further comprising:
   a data message request detector embodied at the mobile station and adapted to receive indications of the data message request generated by said download-parameter request signal generator, said data message request detector for detecting the data message request requesting the initiating of the downloading.

6. The apparatus of claim 5 further comprising an operational parameter value provider coupled to said data call connector, said operational parameter value provider for providing the value of the at least the first operational parameter to the mobile station subsequent to completion of the data call between the network node and the mobile station.

7. The apparatus of claim 6 wherein said data call initiator further comprises a data call status reporter operable at least responsive to successful downloading of the value of the at least the first mobile-station operational parameter provided to the mobile station by said operational parameter value provider to report the successful downloading of the first mobile-station operational parameter to the mobile station.

8. The apparatus of claim 7 wherein said data call status reporter further determines whether the downloading of the first mobile station operational parameter to the mobile station is successful.

9. The apparatus of claim 8 wherein said data call connector further terminates the data call connection subsequent to the report made by said data call status reporter.

10. The apparatus of claim 9 wherein said data call connector further authenticates the mobile station prior to completion of the data call between the node-device and the mobile station.

11. A method comprising:
receiving, at a mobile station, a request from a network part for downloading of a first mobile-station operational parameter;
establishing a direct data call connection directly between the mobile station and the network part;
downloading at least the first mobile-station operational parameter via the direct call connection at the mobile station, the first mobile-station operational parameter being repeatedly used by the mobile station pursuant to subsequent communications; and
providing device information regarding the mobile station to the network part via the direct call connection to enable the network part to determine the operations that are to be performed based on the device information prior to providing the first mobile-station operational parameter.

12. The method of claim 11 further comprising the operation of generating a data-message request that forms the request for downloading, the data-message request generated responsive to the initiation signal.

13. The method of claim 12 wherein the radio communication system provides for SMS (Short Message Service) message communication; wherein the network part comprises a data message service center formed of an SMS service center, and wherein the data-message request generated during said operation of generating the data-message request comprises an SMS message.

14. The method of claim 11 further comprising the operation of:
detecting the data-message request, once received at a mobile station.

15. The method of claim 14 further comprising the operation of determining whether the downloading of the first mobile-station operational parameter to the mobile station is successful.

16. The method of claim 15 further comprising the operation of terminating the data call connection subsequent to determination made during said operation of determining of successful downloading of the first mobile-station operational parameter to the mobile station.

17. An apparatus comprising:
a network part in a radio communication system, the network part comprising:
a download parameter initiation signal generator for generating an initiation signal that initiates a request for downloading of a first mobile-station operational parameter to a mobile terminal; and
a data call connector responsive to acceptance of the request initiated by the initiation signal generated by said download parameter initiation signal generator, said data call connector for establishing a direct data call connection independent of an input from a user of the mobile-station in order to download the at least the first mobile-station operational parameter to the mobile-station for repeated use by the mobile-station during subsequent communications,
wherein the network part is further configured to receive device information regarding the mobile terminal via the direct data call connection and to determine the operations that are to be performed based on the device information prior to downloading the first mobile-station operational parameter; and
a network node comprising a download-parameter request signal generator for receiving the initiation signal, said download-parameter request signal generator for transmitting a data-message request to the mobile-station to notify the mobile-station that at least the first mobile-station operational parameter is available upon request for downloading.

18. Apparatus according to claim 17 wherein said download-parameter request signal generator is configured to transmit the data-message request as a Short Message Service (SMS) message to the mobile-station.

19. A method comprising:
transmitting an initiation signal from a network part to a network node to direct the network node to send a message to a mobile station to initiate a request for downloading of a first mobile-station operational parameter to the mobile-station, the request notifying the mobile-station that at least the first mobile-station operational parameter is available upon request for downloading;
establishing a direct data call connection directly between the network part and the mobile-station in response to the request for downloading;
downloading at least the first mobile-station operational parameter for repeated use by the mobile-station during subsequent communications, and
receiving device information regarding the mobile station via the direct data call connection and determining the operations that are to be performed based on the device information prior to downloading the first mobile-station operational parameter.

20. A method according to claim 19 wherein transmitting the data-message request comprises transmitting the data-message request or a Short Message Service (SMS) message.

21. An apparatus comprising:
a data message request detector at a mobile station configured to receive a request from a network part for downloading of a mobile-station operational parameter; and
a data call initiator configured to establish a direct data call connection directly between the mobile station and the network part and download at least the mobile-station operational parameter via the direct call connection, the mobile-station operational parameter being repeatedly used by the mobile station pursuant to subsequent communications,
wherein the apparatus is further configured to communicate device information regarding the mobile station to the network part via the direct call connection to enable the network part to determine the operations that are to be performed based on the device information prior to providing the mobile-station operational parameter.

* * * * *